United States Patent [19]

Bertram et al.

[11] Patent Number: 5,198,802

[45] Date of Patent: Mar. 30, 1993

[54] COMBINED KEYBOARD AND MOUSE ENTRY

[75] Inventors: Randal L. Bertram, Lexington, Ky.; Pedro C. Rodriguez, Delray Beach; John P. Wright, Boca Raton, both of Fla.

[73] Assignee: International Business Machines Corp., Armonk, N.Y.

[21] Appl. No.: 814,196

[22] Filed: Dec. 20, 1991

Related U.S. Application Data

[63] Continuation of Ser. No. 451,388, Dec. 15, 1989, abandoned.

[51] Int. Cl.[5] .............................................. G09G 3/02
[52] U.S. Cl. ................................... 340/709; 340/710; 340/711
[58] Field of Search ............... 340/709, 712, 710, 711, 340/706

[56] References Cited

U.S. PATENT DOCUMENTS 4,760,386 7/1988 Heath et al. ........................ 340/709

OTHER PUBLICATIONS

Borland, "Eureka: The Solver", Borland International, Scotts Valley, Calif., 1987, pp. 20–21.
Field, "MacWrite and MacPoint, Osborne McGraw-Hill", Berkeley, Calif., 1984, pp. 3–11.
*IBM Technical Disclosure Bulletin* articles as follows:
"Keyboard/Mouse Adapter," vol. 27, No. 5, Oct. 1984 at pp. 3042–3043.
"Bimodal Mouse," vol. 29, No. 1, Jun. 1986 at pp. 421–422.
"Method for Concurrent Support of Keyboard and Mouse," vol. 30, No. 11, Apr. 1988 at p. 110.
"Novel Pointing Device and Cursor Control," vol. 31, No. 5, Oct. 1988 at pp. 276–277.
*Research Disclosure* article entitled "Compatible Mouse and Mouseless User Interface," Apr. 1986, No. 264, article 26411.

*Primary Examiner*—Alvin E. Oberley
*Assistant Examiner*—Xiao M. Wu
*Attorney, Agent, or Firm*—Daniel E. McConnell; Laurence R. Letson

[57] ABSTRACT

Effectiveness of using both a mouse (13) and a keyboard (21) for entry of function selection by cursor (17) is achieved by the system recognizing a mouse entry as such and not moving cursor (17) with transition of displays, while keyboard operation moves the cursor in increments and repositions the cursor as appropriate on transition of displays. Further, after a screen transition the cursor is moved to the normal initial cursor location of the new screen when a keyboard operation calls for cursor movement while the cursor is not near a selection symbol.

40 Claims, 11 Drawing Sheets

COMBINED KEYBOARD AND MOUSE ENTRY

This application is a continuation of application Ser. No. 07/451,388, filed Dec. 15, 1989, now abandoned.

TECHNICAL FIELD

This invention relates to the entry of information into a computer from both a keyboard and a mouse or other traversing control In each case the entry is defined by the position of a cursor on a display. The cursor designates a word or symbol which indicates the content of the entry made with the cursor so located. The entry may be made by the keyboard or by the mouse, and the entry may result in a different display. This invention controls the content of the different display to improve the effectiveness of combining entry by keyboard and mouse.

BACKGROUND OF THE INVENTION

In accordance with this invention a computer supports both keyboard entry and mouse entry with a single cursor on the computer display. Computer programs often use "menus" to call for control entries from the user. A menu is a brief list of items displayed on the computer display, typically a conventional cathode ray tube (CRT). The user selects one of the items on the menu using an input device. The keyboard and mouse are the most widely used of such input devices.

The internal, control program of the computer provides a cursor, which is an emphasized area or a pointer. The cursor defines locations on the screen corresponding to the selection information to be entered. The cursor is often in the form of a highlighted rectangle that encloses a symbol or item. The rectangle may be different color or brightness than the surrounding space on the display.

In typical keyboard entry the cursor is moved by pressing keys which result in the cursor simultaneously appearing at the next input word or symbol and disappearing from the previous input word or symbol. The cursor thus increments or "jumps." For example, arrow keys, one each for up, down, right, and left, move the cursor one step up, down, right, and left respectively with each activation. The tabulate (tab) key is also commonly used to advance from one input symbol to another sequentially from left-to-right with each activation, and from right-to-left when the tab key is depressed simultaneously with shift key. Some keyboard control programs respond to predetermined letters or groups of letters to relocate the cursor on the display, typically while carrying out a command also selected by the entry.

The mouse has become a popular input device in conjunction with a keyboard. The mouse is a traversing device in that its movement causes the cursor to move in a continuous path, thereby moving from one location on the display to another while appearing on the display in a continuous series of locations as it moves between the two locations. The mouse is also represented by a cursor on the screen, often by an arrow so as to emphasize the effective location of the cursor. (In video text applications, the cursor is generally an emphasized rectangle.)

With a conventional mouse, the cursor is moved across the display by sliding the mouse on the table surface. The cursor moves in a direction and amount corresponding to those of the mouse. An entry is selected by pointing the cursor at the display location defining that entry and pressing a button on the mouse.

As perceived by users, the mouse cursor appears at any position on the screen while the keyboard cursor appears only at entry symbols on the screen. Secondly, a keyboard operating program typically repositions the keyboard cursor after a transition between displays, such as from a main menu to a submenu, while a mouse operating program does not reposition the cursor on a transition of displays.

In accordance with this invention a single cursor, preferably an arrow, is used for both keyboard and mouse entry, either of which may be employed for most entries. In accordance with this invention, operator disorientation and inconvenience is avoided by structuring the control program of the computer to distinguish between a keyboard entry and a mouse entry, and to reposition the cursor on transition of displays for a keyboard entry and to not reposition the cursor on transition of displays for mouse entry.

Information entry to a computer from both a keyboard or a mouse with the result displayed by a single cursor is illustrated in various forms by the following publications: *IBM Technical Disclosure Bulletin* articles as follows: "Keyboard/Mouse Adapter," Vol. 27, No. 5, Oct. 1984 at pp. 3042-3043; "Bimodal Mouse," Vol. 29, No. 1, June 1986 at pp. 421-422; "Method For Concurrent Support Of Keyboard and Mouse," Vol. 30, No. 11, April 1988 at p. 110; and "Novel Pointing Device and Cursor Control," Vol. 31, No. 5, Oct. 1988 at pp. 276-277; and *Research Disclosure*, entitled "Compatible Mouse and Mouseless User Interface," April 1986, Number 264, article 26411. U.S. Pat. No. 4,760,386 to Heath et al is of general interest only in that it teaches combined keyboard and mouse entry in which the mouse cursor is hidden during some functions to improve the effectiveness of the display.

In many computer applications, a keyboard cursor and a mouse cursor appear on the screen together. The two function independently. Thus, sliding the mouse does not move the keyboard cursor, and pressing keyboard keys does not move the mouse cursor. Having two such pointers on the screen together is complicated since the user must learn how each pointer works and how they interact. Users also make the mistake of trying to operate a given pointer with the wrong device.

Hence, some software applications are known which combine the two pointers into one pointer. The single pointer may be driven by both the mouse and the keyboard. This avoids the complexity of having two pointers. The problem with this approach is that the pointer always behaves like a mouse pointer or like a keyboard pointer, regardless of which device is used for input. The combined pointer is most commonly implemented as a keyboard pointer which can also be moved by the mouse. This means that sliding the mouse is the same as pressing the arrow keys. It never moves smoothly and freely around the screen as the experienced mouse user would expect. Moreover, the pointer jumps to a new position after a transition between menus or other displays. The mouse user, this inconsistent with the way a mouse pointer normally works.

It is also possible to implement the signal pointer as a mouse pointer which can also be moved by the keyboard. The arrow keys move the pointer in very small increments, causing it to glide in the desired direction. This can be very awkward and inefficient. This method is only used in a few "paint" programs and has limited effectiveness even for those.

DISCLOSURE OF THE INVENTION

A computer system operates from a series of menu and other control displays and provides both a keyboard and mouse, either of which may be operated for entry at any time. Simplicity and ease of operation for inexperienced users is improved by employing a single pointer-cursor which is shared by both the keyboard and mouse. Moreover, consistency is achieved since other software which will be operated by the same operator on the computer will have the same response for either keyboard entry or mouse entry.

The control system of this computer therefore operates to recognize a mouse entry as such and only move the cursor with the mouse, even on transition of displays. The control system of this computer operates to recognize a keyboard operation as such and move the cursor in increments or steps and to reposition the cursor as appropriate on transition of displays.

This prevents disorientation of the machine operator, who typically will be accustomed to the conventional responses of the cursor to the type of entry made. Moreover, the computer will operate under application programs which provide for both keyboard and mouse entry, but which operate the display conventionally for each of those input devices. If the menu and other control selection has a different cursor response from that of the application program, a novice user will not be trained or conditioned to use such programs. Still another advantage in not moving the cursor with a mouse entry on display transition is that otherwise the mouse might have to be picked up and moved bodily to reposition it at a place corresponding to the cursor position on the new display.

To further simplify the response for the operator, a predetermined cursor location is defined to which the cursor is moved when a keyboard operation calls for cursor movement when the cursor is not operatively near a display selection symbol. Specifically, this is to be the last effective cursor location after a cursor movement by keyboard operation, and the normal initial location for the cursor in a new display after transition to a screen by mouse entry. The initial location normally is the top, left selection symbol on the screen.

BRIEF DESCRIPTION OF THE DRAWING

The details of this invention will be described in, connection with the accompanying drawing, in which.

BEST MODE FOR CARRYING OUT THE INVENTION

Figure 1:
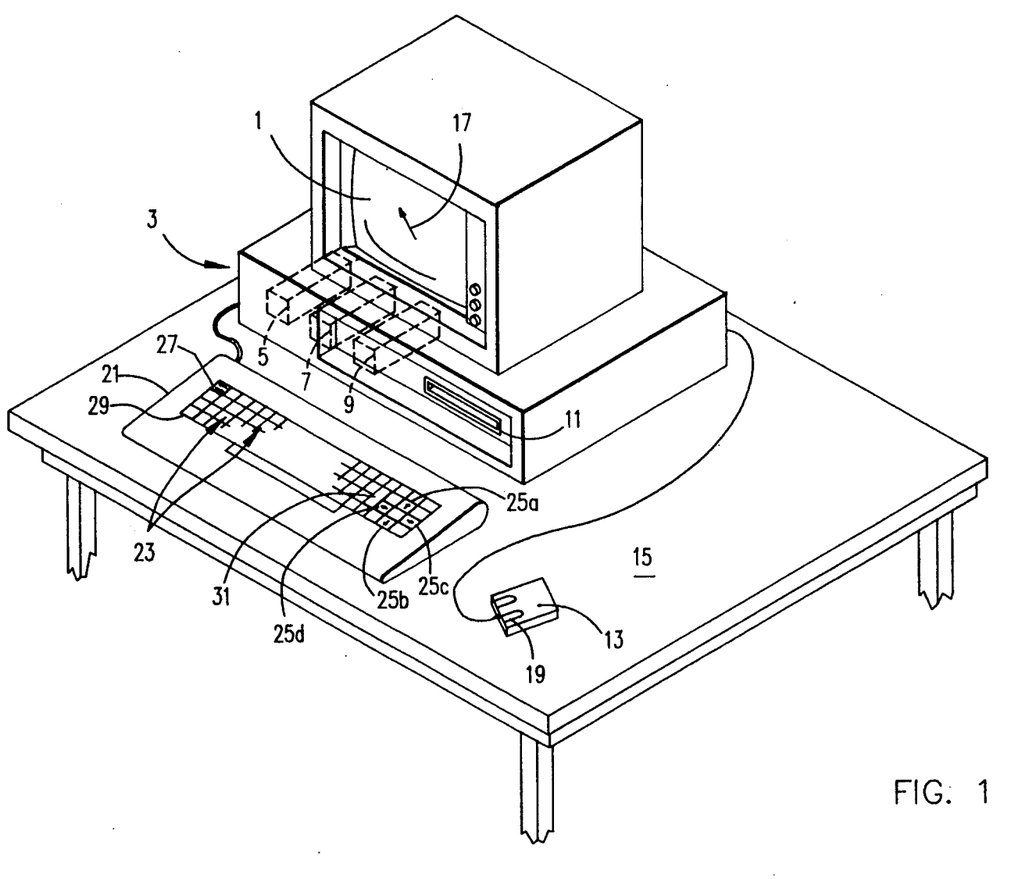
FIG. 1 illustrates the preferred computer system.

FIG. 1 is illustrative of the preferred personal computer assembly in accordance with this invention. This comprises a display 1, normally a CRT producing images which are controlled by the system unit 3. System unit 3 may be basically a standard personal computer having an internal microprocessor 5 (shown symbolically), internal read only memory (ROM) 7, internal random access memory (RAM) 9, and a disk drive 11 which may be an internal "hard" disk storing program and data code or may receive external "floppy" disk storing program and data code, or both. Operating code providing sequential controls of the computer system is by program code embedded in ROM 7 and which may be supplemented by program code added externally for a particular application to RAM 9. The details of such a computer assembly and its sequential control are essentially well established in the personal computer art and form no part of this invention, and therefore are described only generally.

Two entry devices are employed to select certain operating code in this computer assembly. One is mouse 13, which operates conventionally by movement across the table 15 on which the mouse 13 and system unit 3 are normally supported. As is conventional, movement of mouse 13 in any direction moves a cursor 17 on display in a continuous path in the same pattern as the movement of mouse 13. Entry from mouse 13 is by switch or key 19 mounted on the mouse for convenient operation by the user of mouse 13.

The second entry device is keyboard 21, which for purposes of this invention may be a conventional personal computer keyboard. It has a number of alphabet and function keys, shown generally as 23, not used in movement of cursor 17. It has arrow keys, key 25a, an up arrow key, key 25b, a down arrow key, key 25c a right arrow key, and key 25d a left arrow key. Cursor 17 is moved one step in the direction of the arrow key 25a through 25d with each activation of the arrow key 25a through 25d. Keyboard 21 has a tab key 27, and each activation of tab key 27 will move cursor 17 in a step from left-to-right to the next selection designation on display 1 and from right-to-left when shift key 29 is also depressed, this being deactivated by the system in a word processing application, however, so that the tab key 27 will enter the usual typing function of tabulate during text entry. Keyboard 21 has enter key 31 to activate a selection designated by the location of cursor 17. All of the foregoing may be entirely conventional with respect to keyboard entry.

Figure 2A:
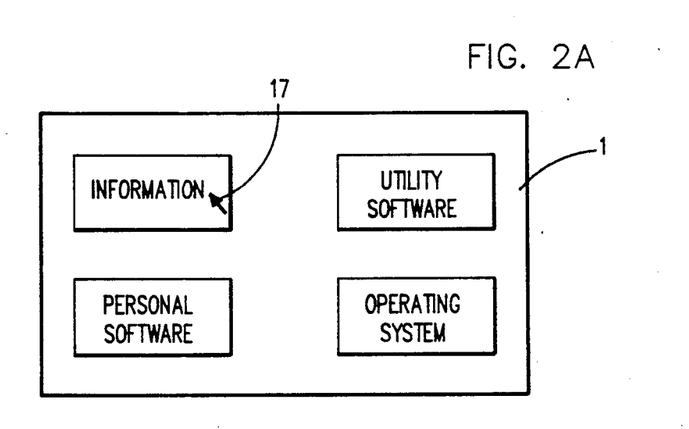
FIG. 2A illustrates an initial control screen display calling for a selection with the cursor positioned for a selection.

FIG. 2A is a screen display appearing when this personal computer system is turned on. It facilitates selection by an operator of the computer of subsequent applications or functions. Thus, cursor 17 is positioned at the selection symbol for one of the four broad categories of application and functions on the screen display 1. These categories are Information: which are Help, Bulletin Board, and Call-in Assistance applications; Personal Software: which may operate any general-purpose application program operable on the computer; utility software: which are programs routinely kept with the computer, such a word processor, spreadsheet, and other capabilities desired by most users; and Operating System: which offers standard interaction directly with an operating system, such as the widely used IBM DOS (disk operating system).

Cursor 17 may be positioned on or close to any of the four symbols for the categories by conventional movement either by keyboard 21 or mouse 13. When positioned on Information as shown in FIG. 2A, operation of the enter key 31 on keyboard 21 causes the screen on display 1 shown in FIG. 2B while operation of the mouse key 19 causes the screen shown in FIG. 2C. These screens are a submenu, requiring another selection to initiate an application. Where the entry was made by keyboard, the computer operating system has repositioned cursor 17 concurrent with the new screen, so that cursor 17 is located at the designation of the top application, On-line Assistance.

Figure 2B:
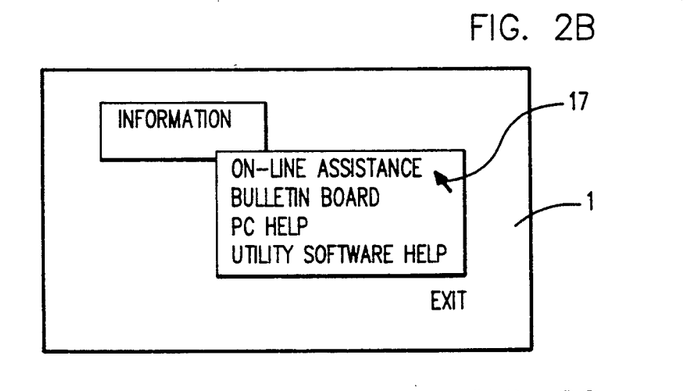
FIG. 2B illustrates the screen after selection of the Information function by keyboard.

The positioning of cursor 17 on On-line Assistance is the standard position for the cursor after a keyboard selection of that submenu, since it is the item highest in the screen which can be selected. To select one of the others, a down arrow key 25b on the keyboard would be operated once to step cursor 17 to bulletin board, and, for example, twice to step cursor 17 to PC help. Activation of enter key 31 then selects the application selected.

Figure 2C:
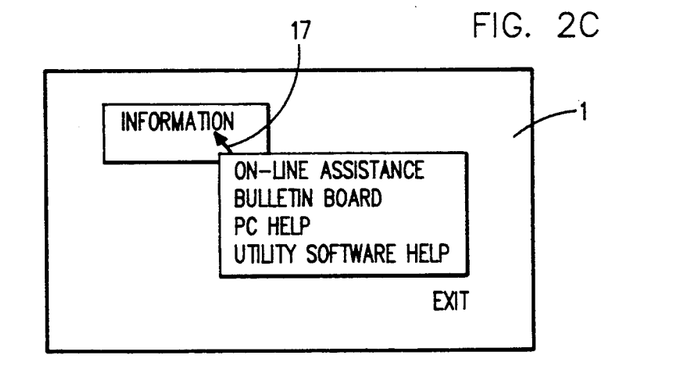
FIG. 2C illustrates the screen after selection of the same function by mouse.

The positioning of cursor 17 unmoved from FIG. 2A after mouse 13 selection as shown in FIG. 2C does not facilitate immediate selection of one of the listed applications. However, it is the position expected by the user from the entry by mouse 13 and mouse 13 itself is positioned on table 15 at a location corresponding to the unmoved location of the cursor 17. To select any of the four applications by mouse 13, cursor 17 is moved to the selected one and the entry key 19 on mouse 13 is activated. This is equally true from the screen shown in FIG. 2B. In all instances, when cursor 17 is not near any selection symbol, entry from closing either mouse switch 19 or keyboard enter key 31 is rejected. In this system near to a symbol is defined by the pointed end of cursor 17 being in a rectangular area centered over the symbol with the boundaries spaced from the symbol a small but visually discernible amount.

To maintain operation of keyboard 21 even though mouse 13 may bring cursor 17 to a location not possible by keyboard 21 entry, the control system, on entry of a movement command by keyboard 21, as from an arrow key 25, cursor 17 moves from the ineffective location to the last normal initial location. Thus, the position of cursor 17 in FIG. 2A results from machine start and is at the upper left. In the screen of FIG. 2C, cursor 17 is not near any selection symbol (Information is not a selection symbol, but is just a graphic for operator assistance). FIG. 2C is reached by transition from the screen of FIG. 2A by an entry signal from mouse 13. Any keyboard 21 cursor-movement operation, as by tab key 27 or an arrow key 25 results in cursor 17 jumping to be near On-line Assistance.

In the following discussions of FIG. 3 through FIG. 8 the responses and function discussed with respect to FIG. 2 are the same except where differences are indicated.

Figure 3A:
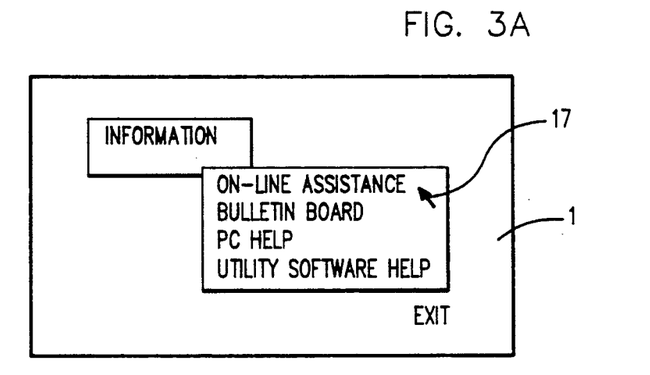
FIG. 3A illustrates the screen selected from the initial control screen with the cursor positioned for selection.
Figure 3B:
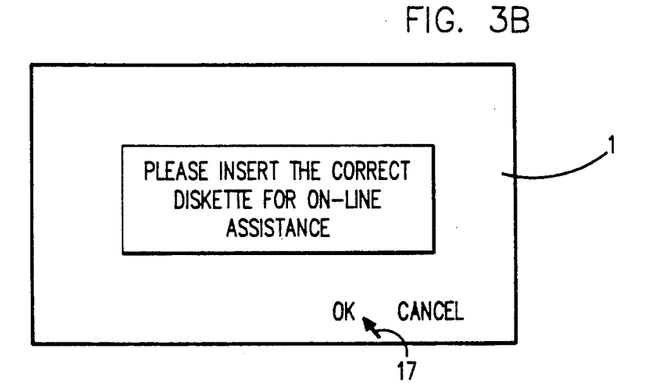
FIG. 3B illustrates the screen after selections of the on-line assistance function by keyboard.
Figure 3C:
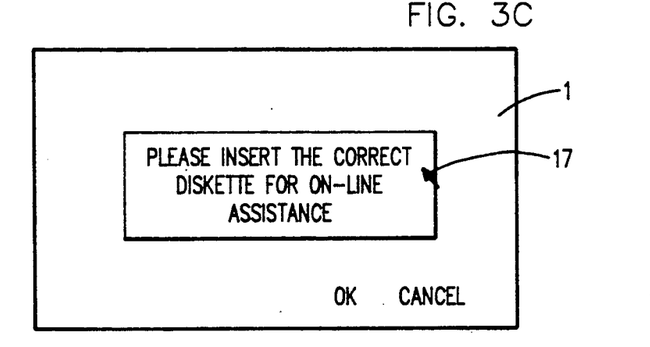
FIG. 3C illustrates the screen after selection of the same function by mouse.

FIG. 3B illustrates the selection of On-line Assistance by keyboard 21 and FIG. 3C illustrates the selection of On-line Assistance by mouse 13. The central part of display 1 gives an instruction to insert a diskette, and for the keyboard 21 selection cursor 17 goes to the OK function symbol, which defines a start selection after the operator inserts the diskette. The entry key 31 for keyboard 21 (or key 19 on mouse 13) is pressed with cursor 17 on that symbol when the called-for diskette is in place and the diskette is then responded to by the computer to conduct the program or function stored on the inserted diskette. Cursor 17 in FIG. 3C from mouse 13 entry is unmoved from the previous screen of display 1 of FIG. 3A. Keyboard 21 selection of a cursor-movement operation when the screen is that of FIG. 3C would bring cursor 17 to OK, which is the normal initial location for cursor 17.

Figure 4A:
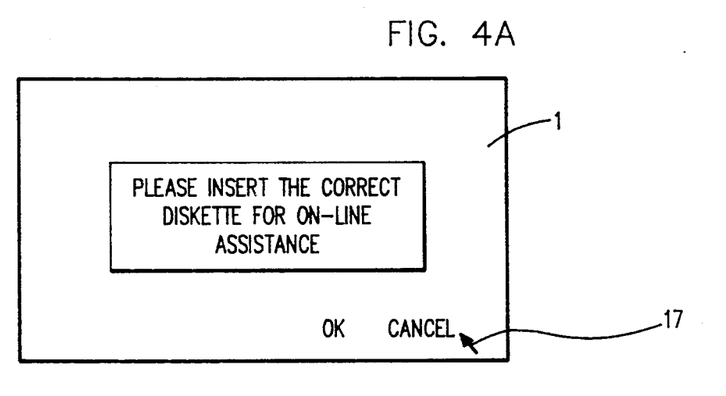
FIG. 4A illustrates an error message screen generated by the computer with cursor positioned for cancel entry.
Figure 4B:
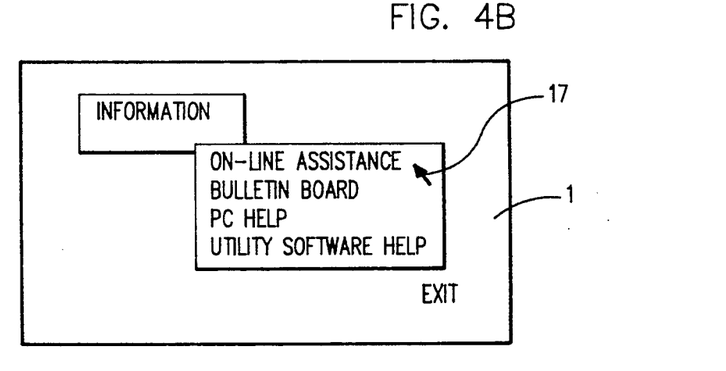
FIG. 4B illustrates the screen resulting from cancellation by keyboard entry.
Figure 4C:
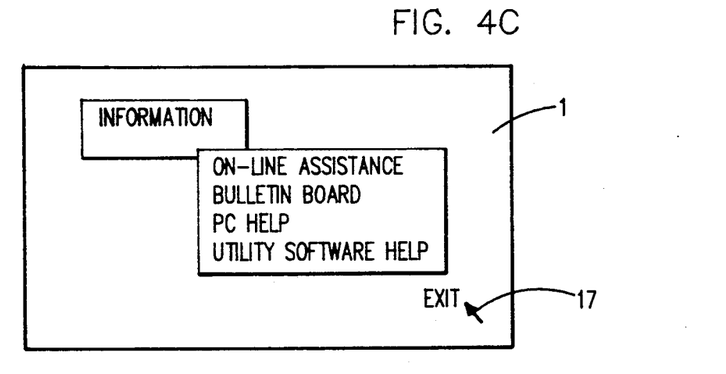
FIG. 4C illustrates the screen resulting from cancellation by a mouse entry.

FIG. 4 illustrates the cancel operation. The cancel function reverses the selection of the current display 1 by returning to the immediate previous display 1. FIG. 4B shows the result of selecting cancel by keyboard 21, in which cursor 17 is repositioned on the recalled screen to the top selection, On-line Assistance, the normal initial location of cursor 17 on the recalled screen. FIG. 4C illustrates the result when Cancel is selected by mouse 13, resulting in the Exit function symbol being at cursor 17 only because it is located where the Cancel symbol was located on the previous screen.

Figure 5A:
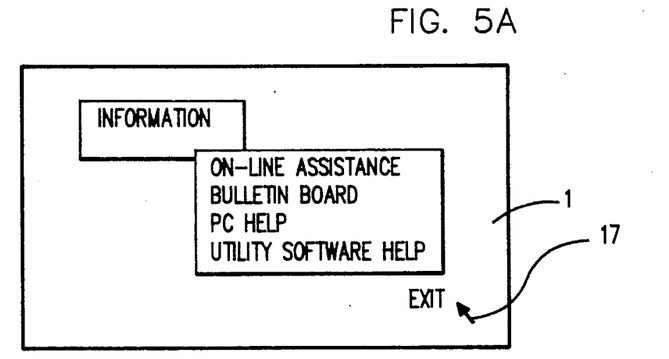
FIG. 5A illustrates an submenu screen with cursor positioned to exit that submenu.
Figure 5B:
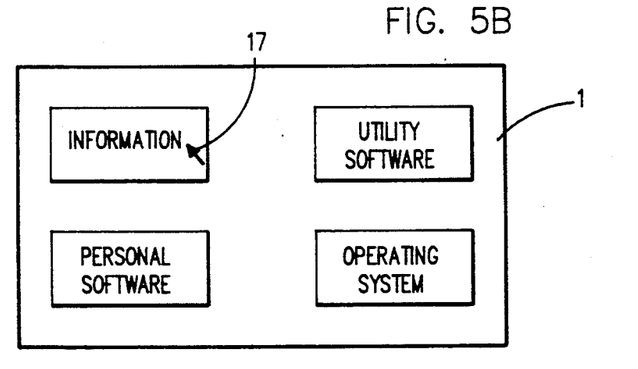
FIG. 5B illustrates the screen resulting from exiting that screen by keyboard entry.
Figure 5C:
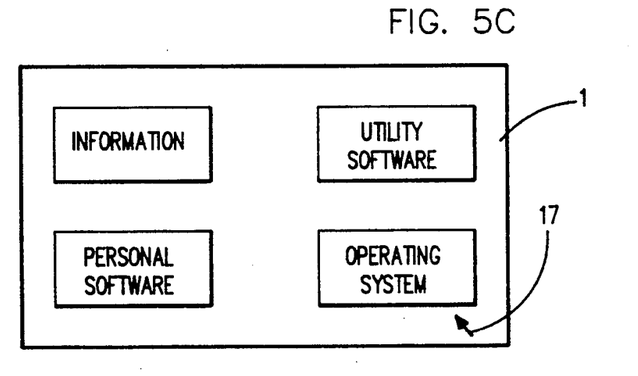
FIG. 5C illustrates the screen resulting from exiting that screen by mouse entry.

FIG. 5 illustrates the exit operation. The exit function reverses the selection of the current display 1 by returning to the immediately previous display 1. FIG. 5B shows the result of selecting Exit by keyboard 21, in which cursor 17 is repositioned on the recalled screen to the top, left selection, Information, because that is the normal initial location of cursor 17 from keyboard selection on the recalled screen. FIG. 5C illustrates the result when exit is selected by mouse 13, cursor 17 being in the lower right.

Figure 6A:
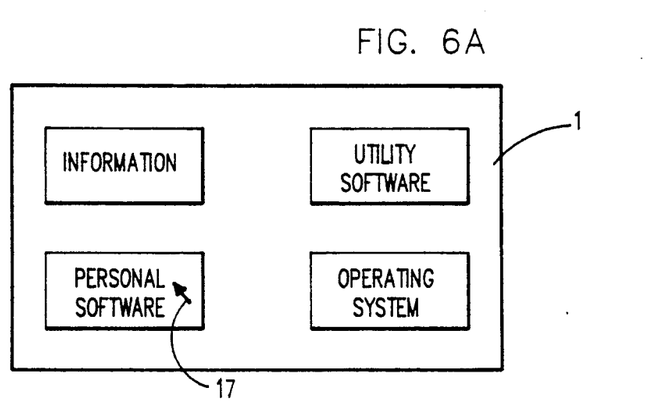
FIG. 6A illustrates the initial control screen with the cursor positioned on the selection of Personal Software.
Figure 6B:
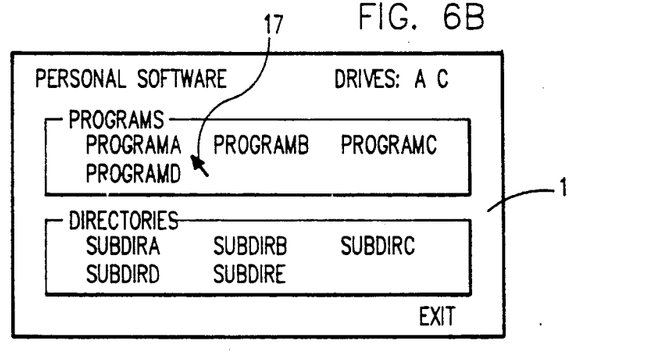
FIG. 6B illustrates the screen, resulting from that selection by keyboard.
Figure 6C:
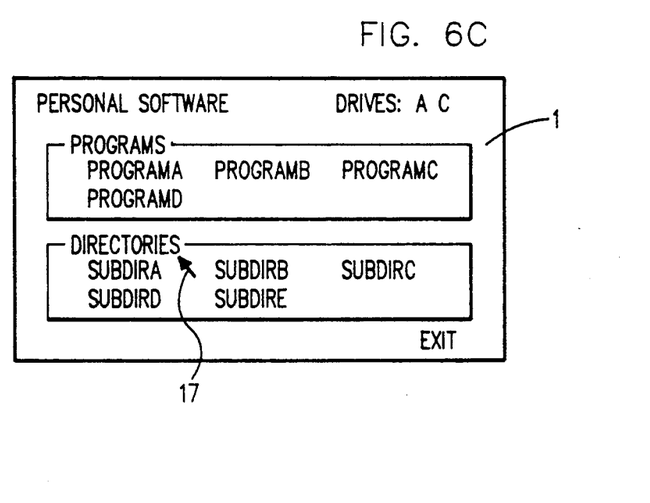
FIG. 6C illustrates the screen resulting from that selection by mouse.

FIG. 6 illustrates the selection of personal software from the initial screen, done by cursor 17 being on the Personal Software symbol of the initial screen on display 1, shown in FIG. 6A. The result of selection by keyboard 21 is shown in FIG. 6B. Cursor 17 automatically is over the PROGRAMA, the top left program in a list of programs, because top-left is the normal position from keyboard 1 selection. The directories are lists of groups of programs specific to each individual user, and each may be selected by moving cursor 17 over them and operating key 29 or key 19. Cursor 17 in the screen of FIG. 6C is not effectively near any selection symbol, but is within an area associated with a group selection symbols associated with subdirectories. A cursor-movement operation by keyboard 21 is responded to by the control system computing the location of the top-left selection symbol in the Directories area and moving the cursor to that, which is SUBDIRA. (The details of such implementation form no part of the claimed invention herein.)

Figure 7A:
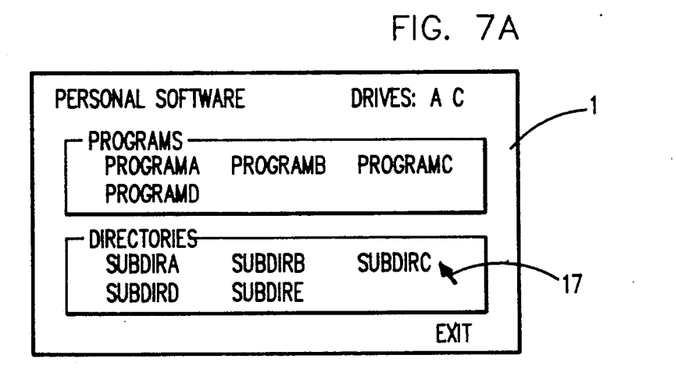
FIG. 7A illustrates the screen selected by selecting Personal Software with the cursor positioned to select SUBDIRC.
Figure 7B:
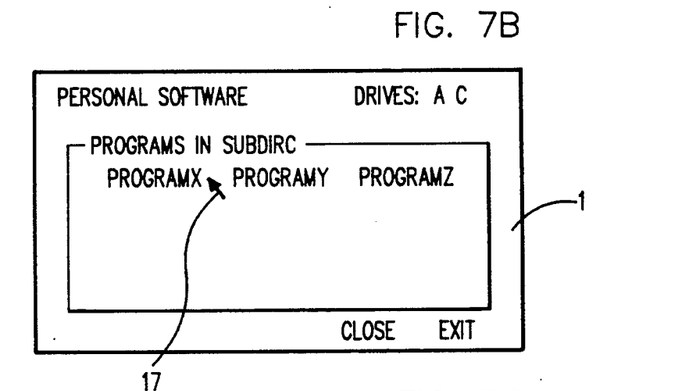
FIG. 7B illustrates the screen resulting from that selection by keyboard.
Figure 7C:
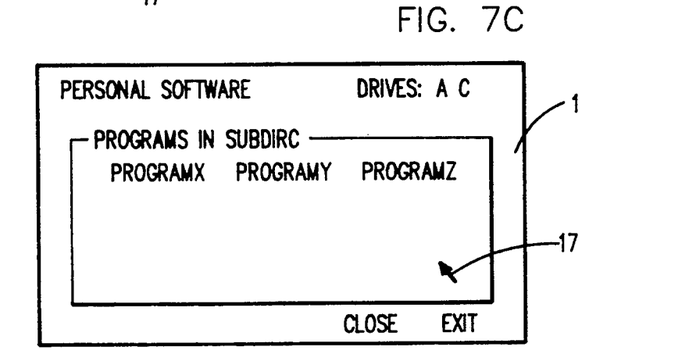
FIG. 7C illustrates the screen resulting from that selection by mouse.

FIG. 7 illustrates selecting SUBDIRC from the screen of FIG. 6B or 6C. FIG. 7B is by selection from keyboard 21, and cursor 17 therefore is at the top, left program, PROGRAMX. FIG. 7C is by selection from mouse 13 and cursor 17 remains at the lower left where it was in FIG. 7A. Any keyboard 21 cursor-movement operation next after entering the screen of FIG. 7C by mouse 13, results in cursor 17 jumping to PROGRAMA.

Figure 8A:
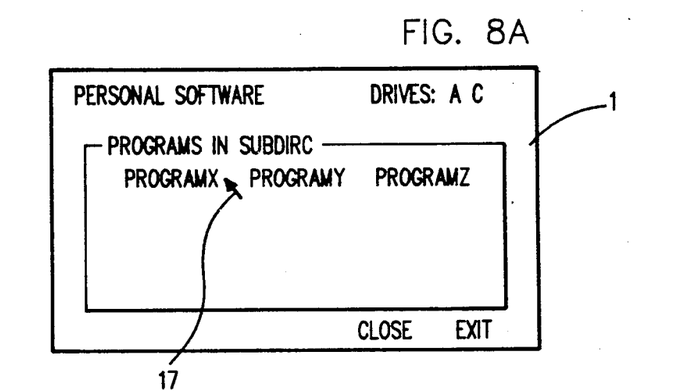
FIG. 8A illustrates the screen selected by selecting SUBDIRC with the cursor positioned to select PROGRAMX.
Figure 8B:
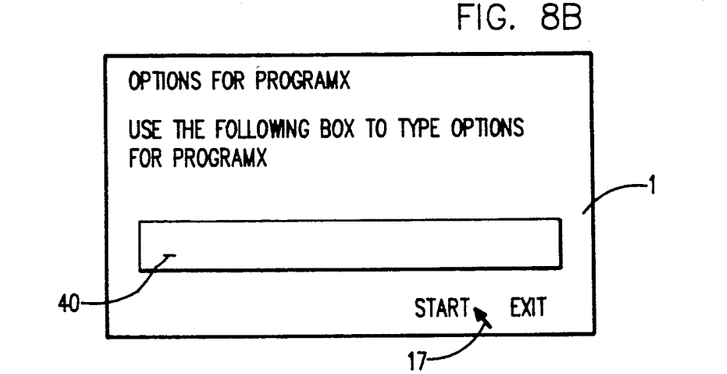
FIG. 8B illustrates the screen resulting from that selection by keyboard.
Figure 8C:
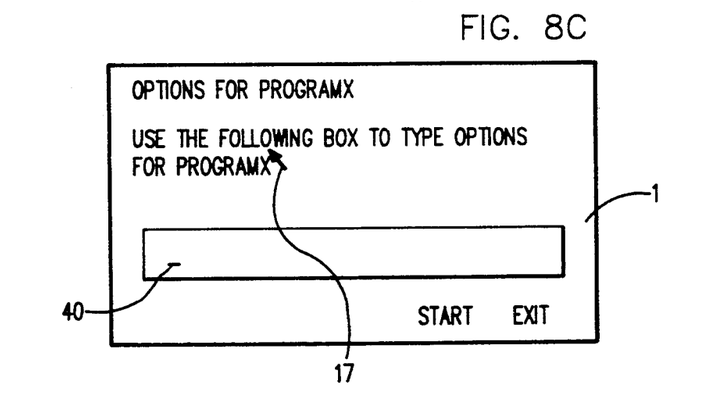
FIG. 8C illustrates the screen resulting from that selection by mouse.

FIG. 8 illustrates the selection of PROGRAMX such as by selection from the screen of FIG. 7B. FIG. 8B shows the result of selection by keyboard 21. Cursor 17 is automatically at the Start selection symbol, selection of which starts the execution of the program designated PROGRAMX. Cursor 17 is moved by entries of tab key 27, the first bringing cursor 17 over the exit symbol and the second bring cursor 17 back over the Start designation. FIG. 8C shows the result of selection by mouse 13. Mouse 13 can be slid upward and left on table 15 to bring cursor 17 anywhere on display 1, but only Start and Exit designation are active. The options block receives alphanumeric text from keyboard 21, designated by a second cursor 40. Arrow keys 25c and 25d are effective to move cursor 40. Typical information entered will be the name previously given a file or "a:" to select a diskette drive. The program is then run by selecting the Start symbol with keyboard 21, key 31 or mouse 13, key 19. The screen of FIG. 8B and 8C is left without running the program by similar selection of the Exit symbol.

Figure 9:
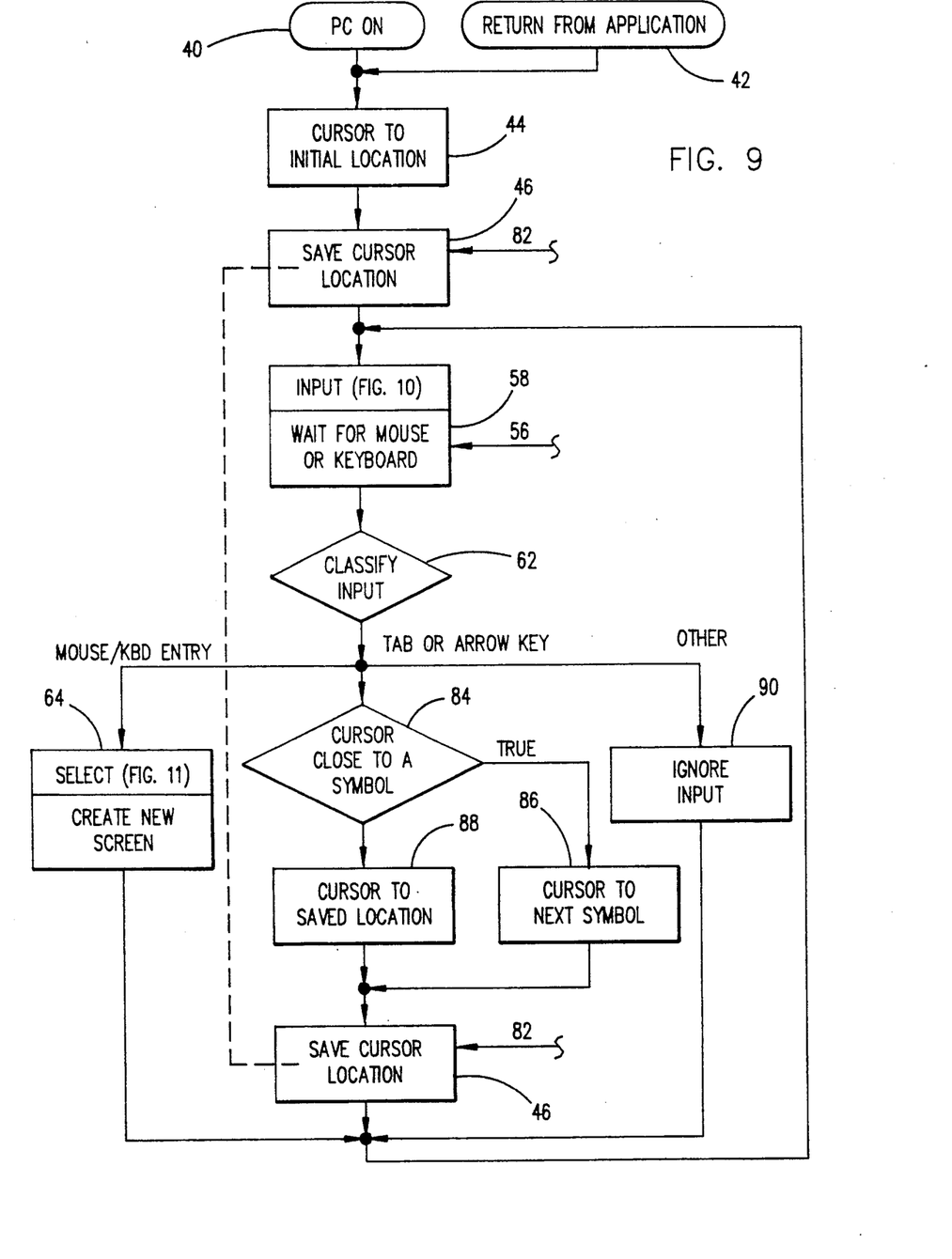
FIG. 9 is a logical or flow diagram illustrating the sequential operation cursor positioning of the computer system.
Figure 10:
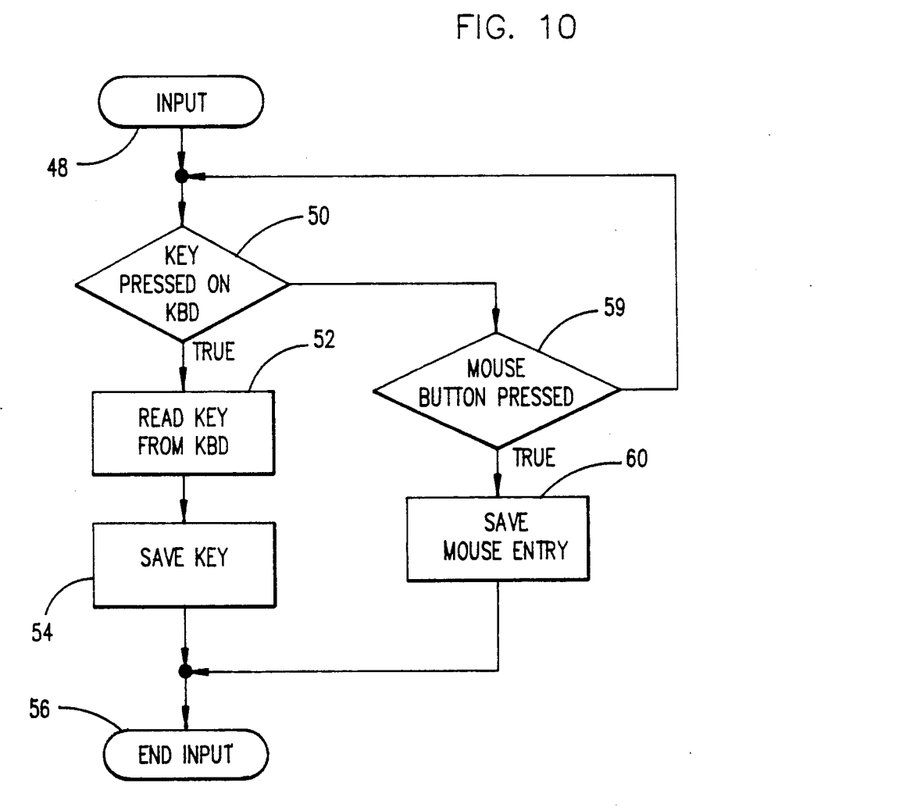
FIG. 10 is a logical flow diagram illustrating the sequential operation of entry monitoring of the computer system.
Figure 11:
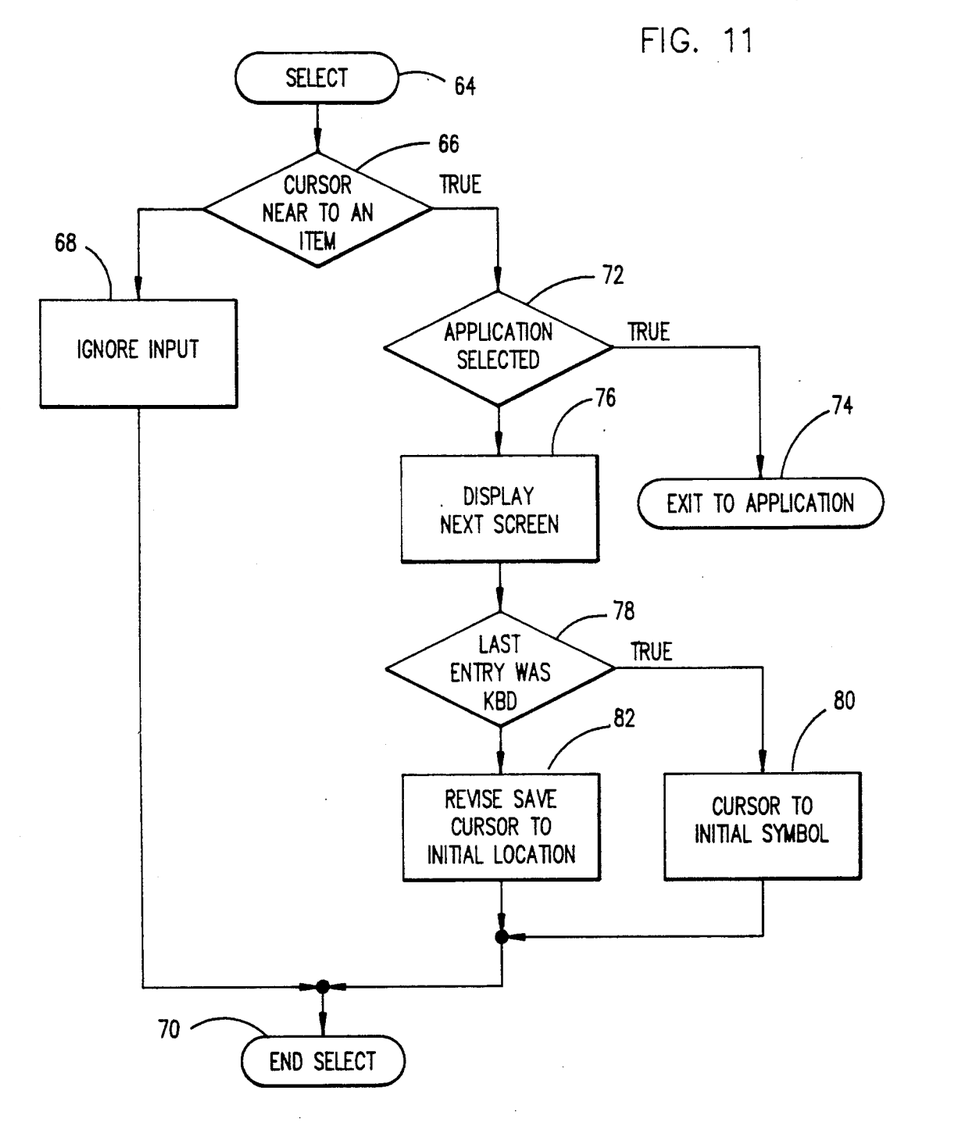
FIG. 11 is a logical flow diagram illustrating the sequential operation of operating code entry.

The sequence of internal operation to achieve the foregoing is shown illustratively in FIG. 9, FIG. 10 and FIG. 11. Initiation is by action 40, turning on the personal computer of FIG. 1 or by action 42, reception of a return-to-system control signal from an application. Action 44 obtains, from permanent storage, the initial location of cursor 17, which from PC On 40 is the Information selection symbol as in FIG. 2A. The initial cursor 17 location is obtained from storage such as by conventional table look-up and preferably by storing that information with other information unique to a particular display 1 screen. That location is stored in memory 46.

The system then begins to wait for a mouse 13 or keyboard 21 action. This operation is shown in FIG. 10, with input 48 starting the subsequent actions. Action 50 determines if an entry is from keyboard 21. If yes (or true) action 52 reads the signal from keyboard 21. That is stored in memory 54 and action 56, end input, signals action 58 of FIG. 9 that an input is stored. Similarly a false conclusion by action 50 signals action 59 which determines if key 19 of mouse 13 is pressed. If yes, the fact of mouse 13 entry is saved in memory, and end input 56 signals action 58 of FIG. 9 that an input is stored. If false, the signal monitoring of input 48 is reinitiated without a signal to end input 56.

Returning to FIG. 9, after receipt of the key information from end input 56, logic 62 classifies the signal as an entry selection signal, a keyboard 21 cursor-movement signal as by tab key 27, or other. These signals, however, do not include cursor movement signal by mouse 13. A standard mouse driver routine runs separately 14 and effectively simultaneously (termed, in the background) with the operation of FIG. 9, FIG. 10 and FIG. 11. This mouse driver moves cursor 17 on the display 1 when mouse 13 physically slides on table 15. Thus, save cursor location 46 is not changed when cursor 17 is moved by mouse 13.

After classification by logic 62, if the signal is an entry signal, it activates the select sequence 64, shown in FIG. 11. Action 66 determines if cursor 13 is near an item. If not, response 68, ignore input, is effective to ignore the entry by signaling end select action 70. If true, logic 72 determines if an application, function or the like has been selected, as distinguished from a subsequent selection screen. If true, running of the application is initiated by activating action 74, exit to application. If false, action 76 displays the next screen (for example, FIG. 2B is displayed upon selection from the screen of FIG. 2A). Logic 78 also determines if the entry was from keyboard 21. If true, action 80 sets cursor 17 to the normal initial cursor 17,.location for that the new screen the initial location being obtained from permanent storage, such as by conventional table look-up and preferably by storing that information with other information unique to that screen. If false, action 82 similarly obtains the normal initial cursor 17 location and revises memory 46 (FIG. 9) to contain that location. Both actions 80 and 82 then activate end select 70. End select 70 returns the operation of FIG. 9 to the waiting status of action 58.

When classify input 62 finds an input to be a keyboard 21 tab key 27 or arrow key 25, action 84 determines if the cursor is close enough to a selection symbol to designate it for selection. If true, action 86 moves cursor 17 to the next symbol designated by the keyboard 21 key pressed, such as one down for key 25b. If not true, cursor 17 is moved by action 88 to the location saved in memory 46. After actions 86 or 88 memory 46 stores the resulting cursor location (which, of course, is the same cursor location for action 88, the revising being only for operating efficiency). After the saving in memory 46, the operation is returned to the waiting status of action 58.

Similarly, when classify input 62 finds the input to be other than a selection entry or a keyboard cursor-movement signal, action 90 causes that signal to be ignored, and operation is returned to the waiting status of action 58.

Certain keys may operate independently of cursor position. In the preferred embodiment an escape (ESC) key automatically selects Exit or Cancel, for example Exit in FIG. 5A. In addition to tab key 27 and arrow key 25, certain other keys may produce a cursor-movement signal. Modifications within the spirit and scope of this invention are anticipated. Coverage is sought as provided by law, with particular reference to the accompanying claims. The response to a cursor not close to any symbol could be to reject any input.

We claim:

1. Computing apparatus comprising a microprocessor, means including said microprocessor to execute operating code, means to display symbols and a cursor for selection of certain said operating code, a keyboard to position said cursor, a cursor traversing device to position said cursor, means including either said keyboard or said traversing device for an operator of said computing apparatus to select said certain operating code by positioning said cursor near selected ones of said displayed symbols and activating a selection signal, and said microprocessor comprising a first control means to move said cursor when said display is changed by said selection from said keyboard and to not move said cursor when said display is changed by said selection from said traversing device.

2. The computing apparatus as in claim 1 also comprising second control means operative at least after said change of display to position said cursor to a predetermined said displayed symbol upon keyboard entry when no said displayed symbol is near said cursor.

3. The computing apparatus as in claim 2 also comprising third control means responsive to a change in said display by said selection from said traversing device to store information representing the normal initial cursor location for said display changed to, and wherein said second control means employs said stored information to locate said cursor at said normal initial cursor location.

4. Computing apparatus as in claim 3 in which said first control means moves said cursor from an initial menu defining broad categories of applications or functions to the top of a list of said applications or functions when said display is changed by said keyboard.

5. Computing apparatus as in claim 1 in which said first control means moves said cursor from an initial menu defining broad categories of applications or functions to the top of a list of said applications or functions when said display is changed by said keyboard.

6. Computing apparatus as in claim 2 in which said first control means moves said cursor from an initial menu defining broad categories of applications or functions to the top of a list of said applications or functions when said display is changed by said keyboard.

7. Computing apparatus as in claim 6 in which said first control means moves said cursor from a list of applications or functions to a selection symbol effective when selected to start said computing apparatus to load software when said display is changed by said keyboard.

8. Computing apparatus as in claim 1 in which said first control means moves said cursor from a list of applications or functions to a selection symbol effective when selected to start said computing apparatus to load software when said display is changed by said keyboard.

9. Computing apparatus as in claim 2 in which said first control means moves said cursor from a list of applications or functions to a selection symbol effective when selected to start said computing apparatus to load software when said display is changed by said keyboard.

10. Computing apparatus as in claim 3 in which said first control means moves said cursor from a list of applications or functions to a selection symbol effective when selected to start said computing apparatus to load software when said display is changed by said keyboard.

11. Computing apparatus as in claim 4 in which said first control means moves said cursor from a list of applications or functions to a selection symbol effective when selected to start said computing apparatus to load software when said display is changed by said keyboard.

12. Computing apparatus as in claim 5 in which said first control means moves said cursor from a list of applications or functions to a selection symbol effective when selected to start said computing apparatus to load software when said display is changed by said keyboard.

13. Computing apparatus as in claim 12 in which said first control means moves said cursor to the initial location of the immediately previous display when current selection is reversed by said keyboard.

14. Computing apparatus as in claim 1 in which said first control means moves said cursor to the initial location of the immediately previous display when current selection is reversed by said keyboard.

15. Computing apparatus as in claim 2 in which said first control means moves said cursor to the initial location of the immediately previous display when current selection is reversed by said keyboard.

16. Computing apparatus as in claim 3 in which said first control means moves said cursor to the initial location of the immediately previous display when current selection is reversed by said keyboard.

17. Computing apparatus as in claim 4 in which said first control means moves said cursor to the initial location of the immediately previous display when current selection is reversed by said keyboard.

18. Computing apparatus as in claim 5 in which said first control means moves said cursor to the initial location of the immediately previous display when current selection is reversed by said keyboard.

19. Computing apparatus as in claim 6 in which said first control means moves said cursor to the initial location of the immediately previous display when current selection is reversed by said keyboard.

20. Computing apparatus as in claim 7 in which said first control means moves said cursor to the initial location of the immediately previous display when current selection is reversed by said keyboard.

21. Computing apparatus as in claim 8 in which said first control means moves said cursor to the initial location of the immediately previous display when current selection is reversed by said keyboard.

22. Computing apparatus as in claim 9 in which said first control means moves said cursor to the initial location of the immediately previous display when current selection is reversed by said keyboard.

23. Computing apparatus as in claim 10 in which said first control means moves said cursor to the initial location of the immediately previous display when current selection is reversed by said keyboard.

24. Computing apparatus as in claim 11 in which said first control means moves said cursor to the initial location of the immediately previous display when current selection is reversed by said keyboard.

25. Computing apparatus comprising a microprocessor, means including said microprocessor to execute operating code, means to display symbols and a cursor in the form of an pointed line for selection of certain said operating code defined by the location of the point of said cursor being near selected ones of said displayed symbols, a keyboard to position said cursor, a cursor traversing device to position said cursor, means including either said keyboard or said traversing device for an operator of said computing apparatus to select said certain operating code by positioning said cursor and activating a selection signal, said microprocessor comprising a first control means to move said cursor when said display is changed by said selection from said keyboard and to not move said cursor when said display is changed by said selection from said traversing device, and second control means to position said cursor to one said displayed symbol upon keyboard entry to position said cursor when no said displayed symbol is near said cursor.

26. Computing apparatus as in 25 also comprising third control means responsive to a change in said display by said selection from said traversing device to store information representing the normal initial cursor location for said display changed to, and wherein said second control means employs said stored information to locate said cursor at said normal initial cursor location.

27. Computing apparatus as in claim 26 in which said first control means moves said cursor from an initial menu defining broad categories of applications or functions to the top of a list of said applications or functions when said display is changed by said keyboard.

28. Computing apparatus as in claim 25 in which said first control means moves said cursor from an initial menu defining broad categories of applications or functions to the top of a list of said applications or functions when said display is changed by said keyboard.

29. Computing apparatus as in claim 28 in which said first control means moves said cursor from a list of applications or functions to a selection symbol effective when selected to start said computing apparatus to load software.

30. Computing apparatus as in claim 25 in which said first control means moves said cursor from a list of applications or functions to a selection symbol effective when selected to start said computing apparatus to load software.

31. Computing apparatus as in claim 26 in which said first control means moves said cursor from a list of applications or functions to a selection symbol effective when selected to start said computing apparatus to load software.

32. Computing apparatus as in claim 27 in which said first control means moves said cursor from a list of applications or functions to a selection symbol effective when selected to start said computing apparatus to load software.

33. Computing apparatus as in claim 32 in which said first control means moves said cursor to the initial location of the immediately previous display when current selection is reversed by said keyboard.

34. Computing apparatus as in claim 25 in which said first control means moves said cursor to the initial location of the immediately previous display when current selection is reversed by said keyboard.

35. Computing apparatus as in claim 26 in which said first control means moves said cursor to the initial location of the immediately previous display when current selection is reversed by said keyboard.

36. Computing apparatus as in claim 27 in which said first control means moves said cursor to the initial location of the immediately previous display when current selection is reversed by said keyboard.

37. Computing apparatus as in claim 28 in which said first control means moves said cursor to the initial location of the immediately previous display when current selection is reversed by said keyboard.

38. Computing apparatus as in claim 29 in which said first control means moves said cursor to the initial location of the immediately previous display when current selection is reversed by said keyboard.

39. Computing apparatus as in claim 30 in which said first control means moves said cursor to the initial location of the immediately previous display when current selection is reversed by said keyboard.

40. Computing apparatus as in claim 31 in which said first control means moves said cursor to the initial location of the immediately previous display when current selection is reversed by said keyboard.

* * * * *